United States Patent [19]

Turnbull

[11] 4,370,784
[45] Feb. 1, 1983

[54] BELTING FABRIC

[75] Inventor: John Turnbull, Charlotte, N.C.

[73] Assignee: Celanese Corporation, New York, N.Y.

[21] Appl. No.: 251,814

[22] Filed: Apr. 7, 1981

Related U.S. Application Data

[62] Division of Ser. No. 15,974, Feb. 28, 1979, Pat. No. 4,298,648.

[51] Int. Cl.³ .............................................. B65N 71/00
[52] U.S. Cl. ........................................ 28/166; 28/169
[58] Field of Search ............... 428/240, 245, 257, 258, 428/259; 156/148; 28/166, 169; 297/474, 468

[56] References Cited

U.S. PATENT DOCUMENTS

| | | | |
|---|---|---|---|
| 2,639,852 | 5/1953 | Sanders et al. | 139/383 R |
| 3,296,062 | 1/1967 | Truslow | 428/257 |
| 3,606,914 | 9/1971 | Maivald | 139/420 R |
| 3,624,016 | 11/1971 | Lew | 427/379 |
| 4,002,791 | 1/1977 | Sawyer | 428/260 |
| 4,107,371 | 8/1978 | Dean | 428/257 |

*Primary Examiner*—James J. Bell
*Attorney, Agent, or Firm*—Roderick B. Macleod

[57] ABSTRACT

An improved woven fabric that is relatively stiff in the filling direction and relatively flexible in the warp direction by virtue of the filling yarns in the fabric being stiffer than the warp yarns in the fabric, wherein the improvement comprises the filling yarns comprise resin bonded multifilament yarns. The product has particular utility in seat belt safety harnesses with belt coiling mechanisms. It is preferred that the resin be a polyurethane in an amount of 0.4–2.0 weight percent; that the filling yarns be twistless polyester multifilament. The process involves the application of an uncured resin to the filling yarns prior to weaving, and curing the uncured resin, preferably after weaving during an otherwise conventional dyeing procedure.

13 Claims, 10 Drawing Figures

FIG. 4
IRREGULAR GLOBULES OF RESIN
DISTORTION
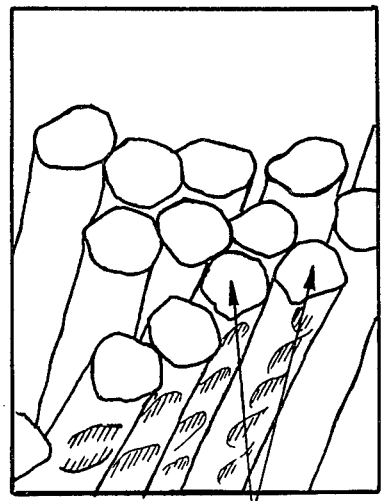
FIG. 5 — DISTORTION
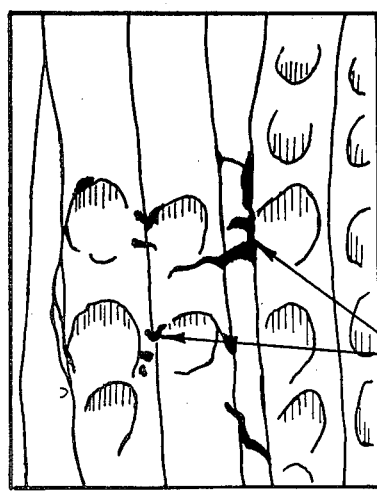
IRREGULAR GLOBULES OF RESIN
FIG. 6

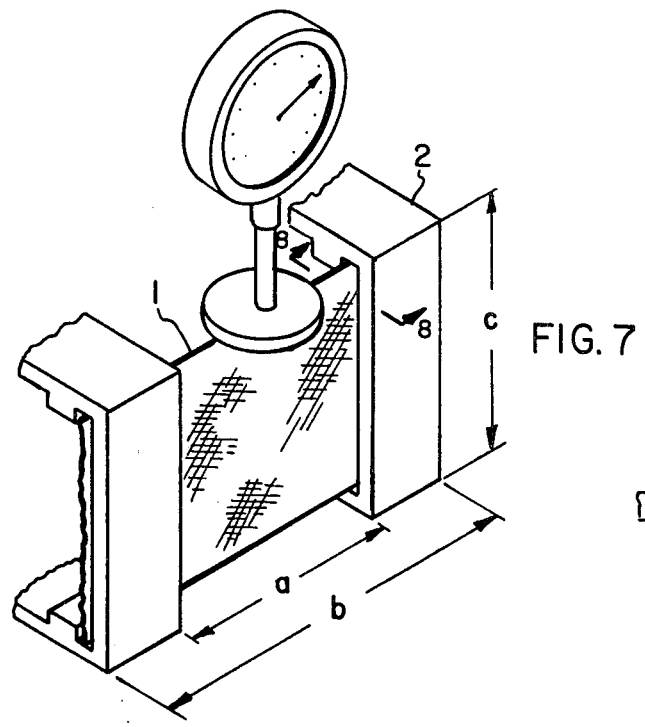
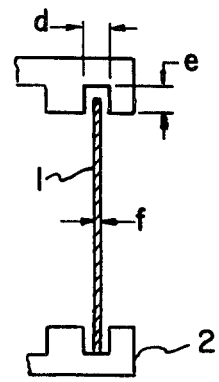
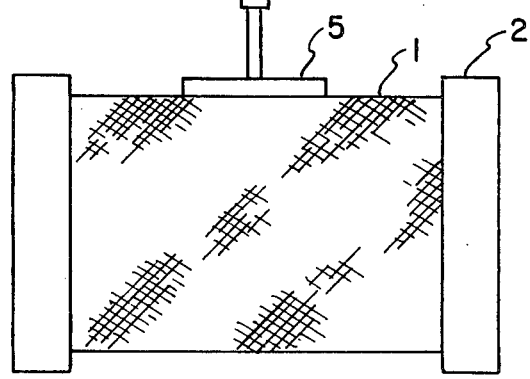

BELTING FABRIC

This is a divisional application of application Ser. No. 15,974, filed Feb. 28, 1979, now U.S. Pat. No. 4,298,648.

BACKGROUND OF THE INVENTION (i) Field of the Invention

The invention relates broadly to woven fabric that is relatively stiff in one direction and relatively flexible in the other. More particularly, it relates to coilable belting fabrics that may be used in seat belt safety harnesses and have reduced tendency to twist and jam in belt retractor mechanisms and associated reversal hardware.

(ii) Prior Art

Safety seat belt harnesses have been used for many years to restrain passengers in vehicles involved in collisions or rapid deceleration. Most such harnesses include a lap belt. On most automobiles to-day, one part of the lap belt is coupled to a self-retracting mechanism which coils part of the belt out of sight and out of sunlight when not in use. Self-retracting mechanisms to-date have not been completely effective, since belts which have a tendency to twist (or fold or rope) can result in the retractor jamming. Jamming of the belt in the retractor can make it impossible for a person to use the seat belt. Also, it can damage the belt and the use of any twisted belt in a harness can result in higher local pressures being applied to part of a person involved in a collision or rapid deceleration.

Various attempts have been made to overcome the foregoing problems.

U.S. Pat. No. 3,606,914 relates to a seat belt with reduced tendency to roll up laterally. It discloses a woven seat belt fabric in which the weft (or filling) threads consist of monofilaments of synthetic linear material, preferably monofilaments of polyethylene glycol terephthalate {or poly(ethylene terephthalate)}, with the monofilaments preferably having a diameter within the range of from 0.15 mm to 0.4 mm. Such a seat belt has stiffer filling yarns than warp yarns. The patent is silent concerning the conversion efficiency of breaking load from the individual warp yarns to fabric along the warp yarns.

U.S. Pat. No. 3,321,245 discloses a self-retracting seat belt in which the warp yarns include eccentrically positioned pretensioned elastic yarns to promote coiling of the belt in spiral form without twisting. It does not involve filling yarns that are stiffer than the warp yarns.

Various U.S. Patents relate to woven fabrics in which the fabric is relatively stiff in the filling direction and relatively flexible in the warp direction.

U.S. Pat. Nos. 3,173,185 and 3,474,885 disclose a woven fabric having materially greater stiffness in one direction than the other. Such stiffness is obtained by chemically fusing the yarns in the desired direction. Specifically, the filling yarns are formed of viscose rayon which may be fused after weaving by treatment with a zinc chloride solution, while the warp yarns are formed of cotton which is not fused by zinc chloride solution.

U.S. Pat. No. 4,107,371 discloses an open weave fabric which is relatively stiff in the filling direction and relatively flexible in the warp direction. The filling yarns are made of heavy denier monofilaments which are relatively stiff. The warp yarns are made of a multifilament core, such as polyester yarn, which is coated with a thermoplastic polymer, such as plasticized polyvinyl chloride. After weaving, the fabric is subjected to a heat treatment which causes the thermoplastic coating to flow, thereby interlocking and stabilizing the fabric.

Various U.S. Patents relate to the application of uniform coatings of resin to pre-existing woven fabrics in order to improve the fabric properties in both warp and weft directions.

U.S. Pat. No. 3,624,016 is directed towards the concept of using polyurethanes as textile assistants in order to enhance the abrasion resistance, crease recovery, softness, and other properties of fabrics, including polyester fabrics.

U.S. Pat. No. 2,639,852 discloses a seat belt of cotton webbing which in impregnated after weaving with a flexible thermoplastic material, such as a vinyl or acrylic resin.

U.S. Pat. No. 4,002,791 is directed towards a belt which is uniformly coated with a polyurethane composition, which belt may be a polyester fabric.

Multifilament yarns are conventionally treated with lubricants, sizes and adhesives in order to facilitate subsequent processing.

U.S. Pat. No. 3,296,062 discloses the use of a nylon filling (weft) yarn treated with resorcinol formaldehyde latex in a woven fabric in which the filling yarn is predominantly visible at the fabric's surface. The disclosure is particularly directed to fabrics which are subsequently coated, and to reducing the weight and stiffness caused by the reinforcing fabric in such composite structures. While the patent refers to automotive seat belts at column i, line ii, no specific examples are given thereto.

SUMMARY OF THE INVENTION

In contrast to the forementioned prior art, an invention has now been discovered which, in its broadest product aspect is an improved woven fabric in which the warp yarns constitute at least 70 percent of the fabric by weight and in which the warp yarns are predominantly visible at the fabric's surface, which fabric is also relatively stiff in the filling direction and relatively flexible in the warp direction by virtue of the filling yarns in the fabric being stiffer than the warp yarns in the fabric, wherein the improvement comprises said filling yarns comprise resin bonded multifilament yarns (defined below).

The use of the resin bonded multifilament yarns as filling in a woven belting fabric results in a product with both high lateral stiffness (defined below) and high breaking load per unit weight of fabric per unit length of fabric. This is surprising and in marked contrast to prior art use of monofilament yarn which has been found to greatly reduce the breaking load of the fabric.

In its broadest aspect the process of this invention is that of:

preparing an improved woven coilable belting fabric for use in a seat belt harness, having warp yarns along the length of the belt and filling yarns transverse to the length of the belt, the improved belt having reduced tendency to twist and jam a conventional retractor mechanism that coils the belt upon activation of a retraction mechanism, which process comprises the steps of:

(i) applying an uncured curable resin to first yarns, each said first yarn comprising more than one filament, thereby forming second yarns; and thereafter, in either sequence (ii) curing said uncured curable resin of said second yarns, thereby forming third yarns; and (iii) weaving a woven belting fabric with said warp yarns and said filling yarns, said filling yarns being selected from the group consisting of said second yarns and said third yarns, whereby said woven coilable fabric has both high lateral stiffness and high conversion efficiency of breaking load from the individual warp yarns to fabric along the warp yarns.

BRIEF DESCRIPTION OF THE DRAWINGS

FIG. 4 is equivalent to FIG. 2, as modified by one embodiment of this invention. It shows irregular globules of resin forming bridges between adjacent filaments.

FIG. 5 is similar to FIG. 4, except that it shows an isometric cross-section of filaments within resin bonded filling yarns of one embodiment of this invention, after removal of the filling yarn from the manufactured woven belting.

FIG. 6 corresponds to FIG. 4, except that it relates to another embodiment of this invention.

FIG. 7 is a fragmentary isometric view of the essential parts of the prior art test apparatus used to measure "lateral belt stiffness" (defined below). The belt to be tested is shown in the apparatus.

FIG. 8 is a vertical cross-section of FIG. 7 in the direction 8—8.

FIG. 9 is an elevational view of FIG. 7 in a direction perpendicular to the view shown in FIG. 8.

DESCRIPTION OF THE PREFERRED EMBODIMENTS

Figure 1:
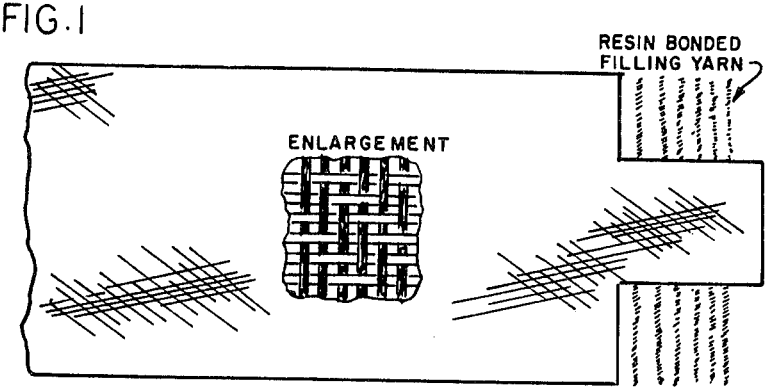
FIG. 1 is a plan view of a section of woven seat belting of the invention. The filling yarn is shown to be resin bonded and easily separated from the warp yarns. An enlargement shows a conventional 2/2 twill weave fabric construction.
Figure 2:
FIG. 2 (Prior Art) is a drawing made from a photomicrograph at an enlargement of 520 of a side view of several filaments of filling yarn removed from a prior art woven belt. It shows distortion (depressions in the filling filaments) caused by transverse contact and pressure from the warp yarns during belt manufacture.
Figure 3:
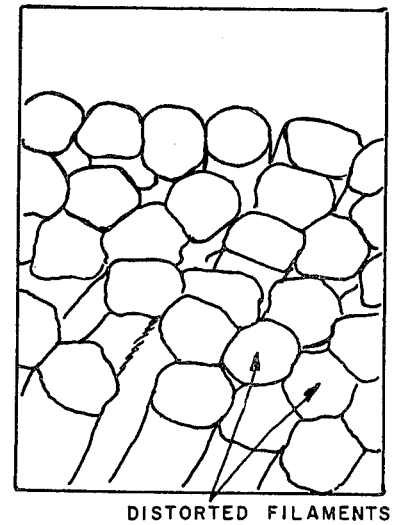
FIG. 3 (Prior Art) is similar to FIG. 2, except that it shows an isometric cross-section of filaments within filling yarns of the prior art, after removal of the filling yarn from the manufactured woven belting. The cross-sections of the filaments have been heavily distorted from their original circular shape.

The preferred embodiments of the invention, both product and process, are shown in the claims and the Examples given below.

The term "resin bonded multifilament yarn" is defined for the purposes of this specification in the following manner. The term includes the product of a process in which "heat-curable resin" (defined below) is applied within the interstices between the filaments of a multifilament yarn, and the heat-curable resin is thereafter cured.

The term "heat-curable resin" is defined for the purposes of this specification in the following manner. It includes all organic chemicals or mixtures thereof which can be cured to an adhesive polymeric material merely by the application of heat. Thus, the term embraces materials such as monomers which can be chemically converted into adhesive polymeric material, as well as thermoplastic material.

From the foregoing, it will be apparent that there are many specific types of heat-curable resin available for practising the invention. However, when the heat-curable resin is in monomeric form, it is preferred that it be a urethane capable of being cured by heat to a polyurethane. When the heat curable resin is a polymer, it is preferred that it be a polyvinyl chloride-acrylate copolymer. Further, when the heat-curable resin is a polymer, it is preferred that it be applied in the form of an emulsion containing polymeric particles predominantly having particles whose diameters are less than the diameters of the filaments in the multifilament yarn. When the heat-curable resin is monomeric in nature, it is preferred that it be applied in the form of an emulsion. It is preferred that emulsions be applied to the yarn by means of a rotating ceramic roll immersed in the emulsion. Since preferential pick-up of solids by the yarn from the emulsion may occur, it is important to maintain the concentration of the emulsion at the target level, and to discard emulsion from which significant preferential pick-up has taken place.

It is preferred that the bonded resin be in the form of irregular globules that bridge adjacent filaments, as shown in FIGS. 4 and 6.

It is preferred that the warp yarns be made from the same polymeric material as the filling yarns. It is more preferred that both filling and warp yarns be prepared from a polyester polymer. It is preferred that the polyester polymer be poly(ethylene terephthalate).

It is preferred that the bonded resin be predominantly located within the interstices between the filaments, as opposed to being predominantly on the outside of the bundle of filaments that form the yarn.

It is preferred that the filling yarn have zero twist (see Example 5 c.f. Example 1).

Test procedures for measuring yarn and lateral belt stiffness are given below. A warp belt stiffness test is described in Example 1.

"LATERAL BELT STIFFNESS TEST"

Equipment

The following equipment is used in this test. The belt holder (2) is shown in FIG. 7, supporting belt sample (1). Dimensions for a, b, and c are 1.75, 3.0, and 2.2 inches respectively. The restraining channels are shown in FIG. 8; the channels are 0.125 inches wide and 0.12 inches deep. The seat belt sample (1) is typically 0.045 inches thick for a polyester belt. The dial indicator (4) along with the 1.25 inch diameter pressure foot (5) are shown in FIG. 9. A change of 0.1 in the indication on the dial corresponds to a pressure foot vertical displacement of 0.1 inch.

A supplier of this dial is Federal Products Corporation, Providence, Rhode Island Model D-81-S low friction, modified as follows: remove rack spring, hair spring and hair spring pin. For lower point, substitute a one inch diameter disc with weight such that total moving parts add up to the desired weight (i.e. 20 grams or 50 grams).

Procedure

Cut six samples three inches long from two inch wide belting fabric. Condition samples for 24 hours at 70° F. and 60% R. H. Wrap the longer edge of the sample around a 3" long by 0.875" diameter dowel and repeat for other side of the belt. Then repeat both steps using a 0.5" diameter dowel.

Insert the belt specimen in the belt holder. Locate the webbing in the slots at the top and bottom of the holder as shown in FIG. 8.

Locate the 1.25 inch diameter disc, attached to the dial indicated, approximately a half inch above the belt sample and release at a speed of 3.5 seconds per one inch travel.

As the disc touches the belt and the dial reads 1.000" start a timer and after 60 seconds record reading on the dial.

Repeat above for two other samples inserted in the holder with the same geometric configuration as the first sample. For the three remaining samples, repeat the procedure but with the belt edge originally in the bottom slot now placed in the top slot. Average the readings for the six samples.

"LOOP PULL TEST" FOR YARN STIFFNESS

Figure 10:
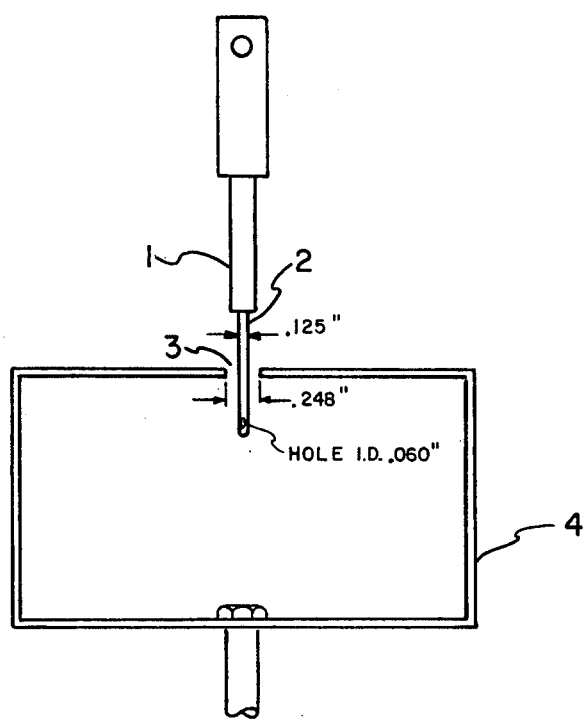
FIG. 10 is an elevation of the test apparatus used to measure "loop pull stiffness" (defined below), which apparatus is used in conjunction with conventional Instron testing equipment of the separating jaws type.

The test apparatus is shown in FIG. 10. In principle, it measures the force required to pull a two inch long sample of yarn sideways through a hole about one quarter inch in diameter. Thus, the yarn sample is held horizontally in the 0.060 inch diameter hole shown in upper pull rod lower section (2) attached to upper pull rod upper section (1) in FIG. 10. The sample is pulled vertically through a hole (3) of 0.248 inches diameter in the lower coupling (4). The force required to bend the sample is reported as yarn stiffness for the particular yarn denier tested. Upper coupling (1) and lower coupling (4) are attached to the couplings of an Instron testing machine, Model TT-C or T.M.

Procedure

1. Prepare Instron for use as follows:
   a. Crosshead speed = 1 inch/minute
   b. Chart speed = 5 inches/minute
   c. Set gauge length so that the hole in upper pull rod is extended approximately ⅛ inch through hole in lower coupling.
   d. Adjust full scale load as required (100 gram full scale load is normally sufficient).
2. Cut sample to be tested into two inch lengths (Note: care should be taken to avoid unnecessarily bending samples before testing).
3. Insert one two inch sample through the hole in shaft of upper pull rod. Sample should be centered so that it is balanced.
4. Switch Instron Pen and Chart "ON".
5. Push "Down" button so that crosshead moves downward onto sample, and sample is pulled through hole in lower coupling.
6. When returning crosshead, care should be taken to guide upper pull rod shaft back through hole in lower coupling. Load cell could be damaged by the "jamming" of these two parts.
7. Record the force required, in grams, to pull the two inch sample through the hole. Report an average of five tests per sample.

The following Examples illustrate, but do not limit the invention. Comparative Examples are also included.

EXAMPLE 1

A conventional poly(ethylene terephthalate) continuous filament yarn was obtained with the following properties.

| Intrinsic Viscosity: | 0.88 dl/g | Number of filaments: | 74 |
|---|---|---|---|
| Denier: | 840 | Filament Cross-section: | Round |
| Break Tenacity: | 8.5 g/d | Coherency Factor: | 27 |
| Break Elongation: | 13.0% | Crimps per Inch: | 0 |
| | | Lubricant: | 0.6% |

A urethane water emulsion produced with 50% solids coded as TR-5418-0 by Spraylat, Inc., was obtained and diluted with an equal volume of water to give 25% solids urethane and homogenized. Analysis indicated the initial components of this urethane were toluene di-isocyanate and polypropylene glycol; trade information indicated this product to be a fully reacted urethane (or "monomer" for polyurethane).

The conventional poly(ethylene terephthalate) yarn was then passed in contact with a ceramic roll, rotating in an emulsion containing the 25% solids urethane emulsion. The yarn denier increased from 840 to 861. This indicated a theoretical urethane solids of 0.63% on a dry weight basis. A two hour Soxhlet extraction was immediately performed with methanol. This test indicated a urethane monomer content of 1.32%, after allowing for the 0.6% lubricant on the yarn. This apparent conflict indicated a preferential uptake on the yarn of urethane (in preference to water). After contacting the ceramic roll, the yarn was wound onto a package, which was then used to produce a yarn with 2.5 turns per inch twist. The twisted yarn was used on a shuttle loom as filling in weaving a belt which comprised a poly(ethylene terephthalate) warp containing 264 ends of two ply 840 denier with 2.5 turns per inch of twist. The belt weave was a 2 up, 2 down twill with 17 picks per inch of filling yarn. An enlargement of the weave is shown in FIG. 1. The belt was approximately two inches wide, 0.055 inches thick with a weight of 11.9 pounds per 100 yards.

The greige belt was processed with 350 pounds tension, for four minutes in hot air at 400° F. to stimulate dyeing conditions and subsequently scoured and dried. This gave a belt elongation at 2500 pounds of less than 10% and a thickness of 0.045 inches, a width of two inches and a weight of 11.7 pounds per 100 yards. The processed belt had a density of 63 pounds per cubic foot.

Another belt processed in an identical manner except that it was dyed to a gold shade, had similar properties, and a breaking strength of 6646 pounds, when tested by the method given in Motor Vehicle Safety Standard No. 209.

Analysis of the belt indicated no bonding between filling yarns as shown in FIG. 1 and relative absence of bonding between warp and filling. Scanning electron photomicrographs at 520 magnification showed that within the filling yarn bundle, voids were present between filaments, the majority of the filaments being approximately hexagonal and pentagonal in cross-section similar to those shown in FIG. 5. Irregular globules of polyurethane can be seen bridging filaments as shown in FIG. 6. Filling yarns removed from the processed belt had a stiffness of 2.4 grams, measured by the "Loop Pull Test" described above. The "Lateral Belt Stiffness" test described above was performed and indicated a stiffness of 0.687 with a 20 gram load and 0.324 with a 50 gram load. Stiffness of the fabric in the warp direction was judged satisfactory when tested by the following test procedure. A seven inch length of belt was flexed three times through three, three eighths inch diameter rods, arranged 0.65 inches between centers. The webbing was supported horizontally in a test stand, with slots half inch wide and 0.15 inch high, giving an overhang of one half inch outside each support. The base of the holder was 0.875 inches from the bottom of the belting mounted horizontally. The belting was judged acceptable for warp stiffness, if when loaded centrally with a 110 gram weight, the belting touched the surface of the test stand. The foregoing test is defined as the "warp stiffness test."

EXAMPLE 2

Example 1 was repeated except that the yarn was not twisted. The final belt had a lateral belt stiffness of 0.829 with a 20 gram load and a stiffness of 0.570 with a 50 gram load.

EXAMPLE 3 (Comparative)

Example 1 was repeated except that no urethane emulsion was used. This resulted in a belt having a lateral belt stiffness of 0.570 with a 20 gram load and a stiffness of 0.230 with a 50 gram load.

EXAMPLE 4

Example 1 was repeated except that the urethane monomer on the yarn was increased to 2.28% (determined by immediate Soxhlet extraction). The final belt had a lateral belt stiffness of 0.738 with a 20 gram load and a stiffness of 0.491 with a 50 gram load.

EXAMPLE 5

Example 1 was repeated except that the urethane monomer on the yarn was increased to 2.28% (determined by immediate Soxhlet extraction) and the yarn was not twisted. The final belt had a lateral belt stiffness of 0.864 with a 20 gram load and a stiffness of 0.661 with a gram load.

EXAMPLE 6 (Comparative)

A polyester 840 denier monofilament was used instead of the filling yarn in Example 1, omitting application of urethane monomer emulsion and twisting but using the same warp yarns. Weaving problems were encountered and although the final belt had excellent lateral stiffness, it surprisingly had a breaking strength 300 to 600 pounds lower in strength than the belt in Example 1.

EXAMPLE 7

Scale-up of Example 1 revealed that as urethane emulsion concentration of 25% resulted in a film build-up on yarn processing surfaces. When the emulsion concentration was decreased to 10%, it was found that this build-up did not occur.

EXAMPLE 8

Example 1 was repeated except that a metallic finish roll rather than a ceramic finish roll, was used to apply the finish. Severe problems were encountered with regard to the uniformity and level of finish application.

EXAMPLE 9

Example 1 was repeated except that the urethane emulsion was replaced by GEON 576, a polyvinyl chloride-acrylate copolymer, manufactured by B. F. Goodrich. The fineness of particle grind was in the 0.25 to 0.30 micron range, which size is several times smaller than the diameter of the filaments used in this example. The product had less than 2% by weight of polyvinyl acrylate copolymer on the yarn. The "Loop Pull Test" stiffness of the filling yarn was 4.1 grams. The lateral belt stiffness was judged similar to that of Example 1 in a tactile test, in which the belt sides were squeezed. The belt strength was similar to that of Example 1.

What I claim is:

1. A process for preparing an improved woven coilable belting fabric for use in a seat belt harness, in which the warp yarns constitute at least 70 percent of the fabric by weight, by weaving warp yarns along the length of the belt and multifilament filling yarns transverse to the length of the belt, the improved belt having reduced tendency to twist and jam a conventional retractor mechanism that coils the belt upon activation of a retraction mechanism, which process comprises the steps of:
   (i) applying an uncured heat-curable resin to said multifilament filling yarns prior to weaving;
   (ii) weaving a fabric wherein said filling yarns constitute less than 30 percent by weight of said fabric; and
   (iii) curing said uncured resin after weaving,
whereby said woven coilable fabric has both high lateral stiffness and high conversion efficiency load from the individual warp yarns to fabric along the warp yarns.

2. The process of claim 1, wherein said cured resin comprises a polyurethane.

3. The process of claim 1, which comprises applying said uncured curable resin dispersed in a diluent, said filling yarns comprising less than 10 percent by weight of said diluent.

4. The process of claim 3, wherein said filling yarns comprise less than 5 percent by weight of said diluent, and less than 2 percent by weight of said uncured curable resin.

5. The process of claim 4, wherein said filling yarns comprise less than 5 percent by weight of said diluent, and less than 1 percent by weight of said cured curable resin.

6. The process of claim 1, wherein said resin comprises polyvinyl chloride-acrylate copolymer.

7. The process of claim 1, which comprises applying a plasticized polyvinyl chloride.

8. The process of claim 1, which comprises applying a polymeric resin as particles having diameters predominantly less than 20 microns.

9. The process of claim 1, which comprises curing said curable resin after weaving said fabric.

10. The process of claim 1, which comprises curing said curable resin before weaving said fabric.

11. The process of claim 1, which comprises simultaneously dyeing and curing said curable resin.

12. The process of claim 1, which comprises applying said curable resin by means of a rotating roll having a ceramic surface.

13. The process of claim 1, which comprises applying said curable resin simultaneously to numerous first yarns during a beaming operation.

* * * * *